US005497136A

United States Patent [19]

Wall

[11] Patent Number: 5,497,136

[45] Date of Patent: Mar. 5, 1996

[54] LOCATING RING FOR ENCAPSULATING A COIL

[75] Inventor: John H. Wall, Columbia City, Ind.

[73] Assignee: Dana Corporation, Toledo, Ohio

[21] Appl. No.: 238,619

[22] Filed: May 4, 1994

Related U.S. Application Data

[63] Continuation-in-part of Ser. No. 983,461, Nov. 30, 1992, abandoned.

[51] Int. Cl.[6] .............................. H01F 5/00; H01F 27/02; H01F 27/30; H02K 1/00

[52] U.S. Cl. ............................ 335/299; 335/292; 336/96; 336/205; 336/208; 336/92; 310/194; 264/272.11; 264/272.19; 29/602.1; 242/7.07

[58] Field of Search ............................ 264/271.1, 272.11, 264/272.15, 272.19, 274; 336/96, 205, 208, 198, 185; 335/292, 299; 310/194; 242/326.3, 533.3, 570, 571, 571.1, 571.2, 571.3

[56] References Cited

U.S. PATENT DOCUMENTS

| | | | |
|---|---|---|---|
| 1,853,301 | 4/1932 | Davidge | 242/571 |
| 1,859,248 | 5/1932 | Strait . | |
| 2,847,650 | 8/1958 | Glassanos . | |
| 2,956,312 | 10/1960 | Naimer . | |
| 3,210,701 | 10/1965 | Fastner et al. . | |
| 3,496,504 | 2/1970 | Daley . | |
| 3,525,966 | 8/1970 | Wierzbinski . | |
| 3,544,937 | 12/1970 | Boysen . | |
| 3,691,493 | 9/1972 | Boysen et al. . | |
| 3,925,744 | 12/1975 | Canney . | |
| 4,429,294 | 1/1984 | Meffert et al. . | |
| 4,740,145 | 4/1988 | Shurman . | |
| 4,754,250 | 6/1988 | Duin . | |
| 5,008,060 | 4/1991 | Kanai et al. . | |
| 5,019,104 | 5/1991 | Whiteside et al. . | |
| 5,100,311 | 3/1992 | Clemens et al. . | |
| 5,155,461 | 10/1992 | Teerman et al. . | |
| 5,194,694 | 3/1993 | Hendel et al. . | |

*Primary Examiner*—Leo P. Picard
*Assistant Examiner*—Stephen T. Ryan
*Attorney, Agent, or Firm*—MacMillan, Sobanski & Todd

[57] ABSTRACT

A locating ring for positioning and supporting an electric coil within a mold for encapsulation of the coil. The locating ring comprises an annular body defining a central axis and a plurality of tabs extending generally axially from the annular body. The annular is adapted to insulate the coil from a steel shell. The tabs are adapted to position the coil within the mold. In a preferred embodiment, the tabs include a recess along a portion of the radially inner face thereof which receives the encapsulating material prevents the separation of the tabs therefrom. In an alternate embodiment, a portion of the sidewalls of each tab are tapered outwardly from the inner face to the outer face thereof. In another aspect of the invention, the body of the locating ring includes a plurality of circumferentially spaced openings extending axially therethrough which provide a number of routes by which air may be vented during the molding operation.

20 Claims, 2 Drawing Sheets

LOCATING RING FOR ENCAPSULATING A COIL

CROSS REFERENCE TO RELATED APPLICATION

This application is a continuation in part of U.S. application Ser. No. 07/983,461, filed Nov. 30, 1992, now abandoned.

BACKGROUND OF THE INVENTION

1. Field of the Invention

The invention relates generally to the manufacture of encapsulated electric coils for use in electromagnetic devices. More particularly, the invention relates to a device for positioning and supporting such a coil within a mold for encapsulation by a dielectric material.

2. Summary of Related Art

Encapsulated coils are well known devices used in a wide variety of applications. Such encapsulated coils are formed of a coil of metal wire which is disposed within a metal shell and encapsulated with a dielectric material. An insulating ring, also formed of a dielectric material, is secured between the coil and the shell to prevent any electrical connection therebetween.

To form such an encapsulated coil, the metal shell is placed in a lower mold portion, and the insulating ring is positioned within the shell. A typical insulating ring is formed of a substantially flat ring having a pair of tabs extending perpendicularly from the outer circumference thereof. The coil is then positioned on top of the insulating ring and is spaced apart from the tabs. An upper mold portion is placed on the lower mold portion. This upper mold portion includes a core which extends within a central passage of the coil.

Means are generally provided for positioning the coil relative to the mold. Typically, the upper mold portion includes a number of fingers which engage the inner periphery of the coil to position the coil properly relative to the mold. The outer periphery of the coil is spaced radially inwardly a uniform distance from the peripheral wall of the mold, and the inner periphery of the coil is spaced radially outwardly a uniform distance from the peripheral wall of the mold core. The exposed surfaces of the coil and the insulating ring are encapsulated by the moldable, dielectric material. However, those portions of the coil which are in contact with the positioning fingers are not encapsulated.

Thus, with the positioning fingers used previously, portions of the coil wire remain exposed in the completed coil assembly. It would therefore be desirable to provide a locating ring which properly positions the coil within the mold and allows the complete encapsulation thereof, while also insulating the coil from the metal shell.

Furthermore, the cycle times for the injection molding systems typically used in the manufacture of electric coils have increasingly become shorter. The faster injection of the moldable dielectric material has made it more difficult to allow for proper venting of the mold. This, in turn, has resulted in a greater number of bubbles and defects in the post-molded coil assembly. It would therefore also be advantageous to provide an improved locating ring which permits faster injection of the dielectric material.

SUMMARY OF THE INVENTION

The invention relates to a locating ring for positioning and supporting an electric coil within a mold for encapsulation of the coil and for electrically insulating the coil from a metal shell. The locating ring comprises an annular body defining a central axis and a plurality of support tabs extending generally axially from the annular body. The annular body is adapted to insulate the coil from a metal shell. The support tabs are adapted to engage the inner axial surface of the electric coil to properly position the coil within a mold.

In a preferred embodiment, the support tabs are provided with a flange along at least a portion of its periphery which is spaced radially outwardly from the inner face thereof. In an alternate preferred embodiment, the support tabs are provided with tapered sidewalls. During the molding operation, the encapsulating material flows around the flanges or tapered sidewalls provided along the periphery of the support tabs. Thus, in the post-molded coil assembly in accordance with the invention, the overmold is provided with a means to grip the support tabs and prevent the separation of the tabs therefrom.

In another aspect of the invention, the locating ring comprises an annular body defining a central axis and having an upper face and a lower face, and the body includes a plurality of circumferentially spaced openings extending axially therethrough. The annular body is also provided with a plurality of support tabs extending generally axially from the upper face of the body which are adapted to engage the inner surface of an electric coil. The openings extending through the body of the locating ring provide a number of routes by which air may escape during the molding operation. This reduces the number of bubbles found in the post-molded coil assemblies.

BRIEF DESCRIPTION OF THE DRAWINGS

The above, as well as other advantages of the invention, will become readily apparent to those skilled in the art from the following detailed description of a preferred embodiment when considered in the light of the accompanying drawings in which.

DESCRIPTION OF THE PREFERRED EMBODIMENTS

Figure 1:
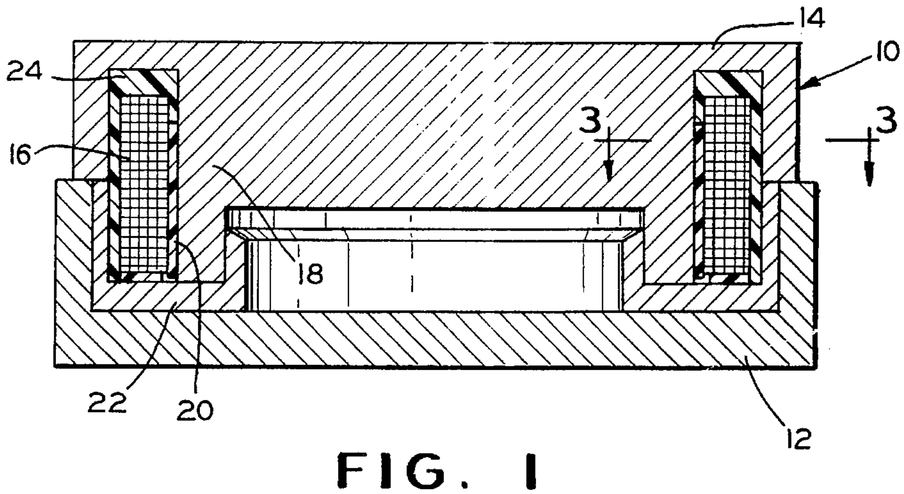
FIG. 1 is a cross-sectional side view of a mold apparatus after encapsulation of a coil contained therein, including a locating ring in accordance with this invention.

Referring now to the drawings, there is illustrated in FIG. 1 a mold apparatus 10 including a lower mold portion 12 and an upper mold portion 14. The lower mold portion 12 defines an annular interior cavity adapted to support and contain an electric coil 16 for dielectric encapsulation thereof. The upper mold portion 14 includes a mold core 18 which extends coaxially within the central passage of the coil 16. Within the mold 10, the coil 16 is supported and properly positioned by a locating ring 20, which rests within a steel shell 22 disposed within the lower mold portion 12. A moldable dielectric material is injected into the mold cavity to form an overmold 24 surrounding the entire exposed surface of the coil 16.

Figure 2:
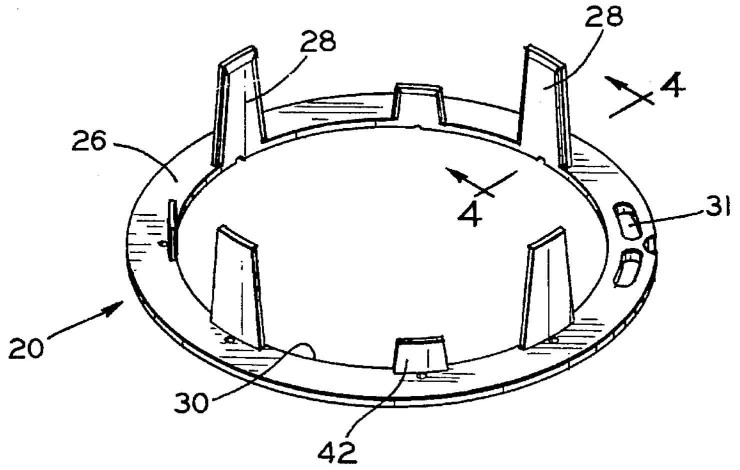
FIG. 2 is a perspective view of the locating ring of the invention shown separately.

A preferred embodiment of the locating ring 16 is clearly illustrated in FIG. 2, where it is shown separately. The locating ring 16 includes a generally flat ring portion 26 with a plurality of circumferentially spaced support tabs 28 extending generally perpendicularly from the inner circumference 30 of the ring portion 26. The support tabs 28 are inserted into the central passage of the coil 16 prior to the molding operation, and engage the inner, axial surface of the coil 16. The support tabs 28 are thus intended to support and retain the coil 16 in the desired position within the mold 10 during the molding operation. The ring portion 26 is also generally provided with a D-slot 31 or other form of aperture for the coil connecting leads (not shown).

The locating ring 20 is provided with at least three support tabs 28 which are preferably equally spaced about the inner circumference 30 of the ring portion 26. The dimensions of the support tabs 28 are such that the coil 16 is adequately supported and retained in position within the mold 10. The number of support tabs for a particular application depends upon the inner diameter and cross-sectional area of the specific electric coil being encapsulated, and may range anywhere from three to thirty-five or more for particularly large electric coils.

Figure 3:
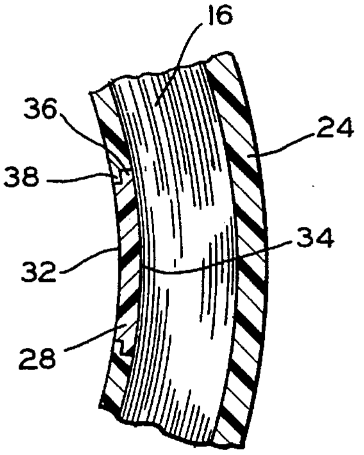
FIG. 3 is an enlarged plan view of a portion of the post-molded coil assembly as viewed along lines 3—3 of FIG. 1 without the mold apparatus.

As best seen in FIG. 3, each support tab 28 includes a radially inner face 32 and a radially outer face 34, with a sidewall extending therebetween. Preferably, the sidewall of each of the support tabs 28 includes a means for receiving the encapsulating material. In the preferred embodiment illustrated in FIGS. 1–4, at least a portion of the sidewall of each support tab 28 is provided with a flange 36 which is spaced radially outwardly of the inner face 32 thereof. Preferably, the flange 36 is provided along at least one of the axially extending portions of the sidewall of the support tabs 28, and is more preferably provided along both of the axially extending edges of the radially outer face 34.

During the molding operation, the dielectric material which is injected into the mold 10 flows around the flanges 36 and into the notches or recesses 38 defined by the flanges 36 at the inner face 32 of the support tabs 28. Thus, in the post-molded coil assembly, as illustrated in FIG. 3, the portion of the overmold 24 which fills the recesses 38 resists radially inward movement of the flanges 36, and thus of the support tabs 28. This prevents the separation of the support tabs 28 from the overmold 24 during operation of the post-molded coil assembly.

The locating ring 20 may also include a plurality of circumferentially spaced positioning tabs 42, the primary function of which is to help center the locating ring 20, and thus the coil 16, within the mold 10. As the positioning tabs 42 are not necessary to support the coil 16, they may be significantly shorter than the support tabs 28. Preferably, the positioning tabs 42 and the support tabs 28 are positioned about the inner circumference 30 of the ring portion 26 in an alternating fashion. Furthermore, while the relatively shorter positioning tabs 42 are less likely to separate from the overmold 24 than the support tabs 28, it may be desirable to provide the positioning tabs 42 with flanges in the same manner as discussed above for the support tabs 28.

In accordance with another aspect of the invention, the ring portion 26 is provided with a plurality of circumferentially spaced openings 40 extending axially through the entire thickness of the ring portion 26. The openings 40 provide routes for gas to escape during injection of the encapsulating material into the mold 10.

Figure 4:
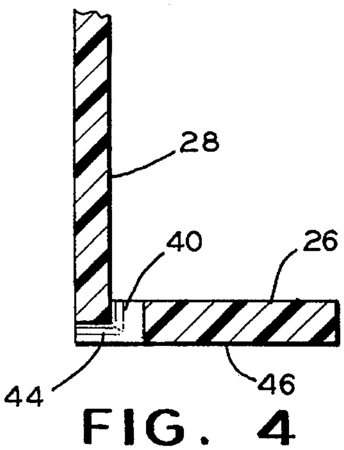
FIG. 4 is a cross-sectional view of the locating ring tarn along lines 4—4 of FIG. 2.

In a preferred embodiment illustrated in FIG. 4, the lower face 46 of the ring portion 26 is provided with a channel 44 associated with each of the openings 40, which connects the associated opening 40 and the inner circumference of the ring portion 26. The gas which is forced between the coil 16 and the ring portion 26 by the injection of the encapsulating material may escape through the openings 40 and channels 44 to the inner circumference of the ring portion 26, where it can escape through the mold vents (not shown).

The occurrence of bubbles in the post-molded coil assembly is further reduced if the openings 40 and associated channels 44 are radially aligned with, and positioned radially outwardly from, the support tabs 28. It is believed that this further improvement results because the openings 40 remain open longer during the molding operation, since a certain amount of time is required for the encapsulating material to flow around the support tabs 28.

Figure 5:
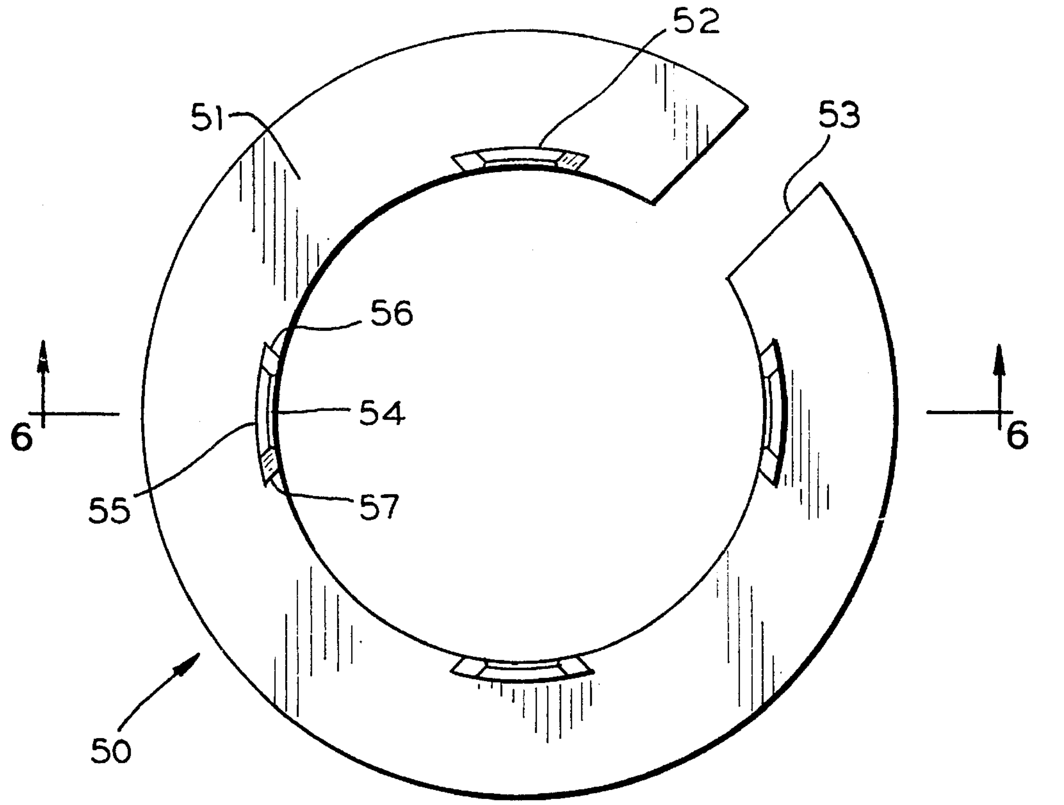
FIG. 5 is a plan view of an alternate embodiment of the locating ring of this invention.
Figure 6:
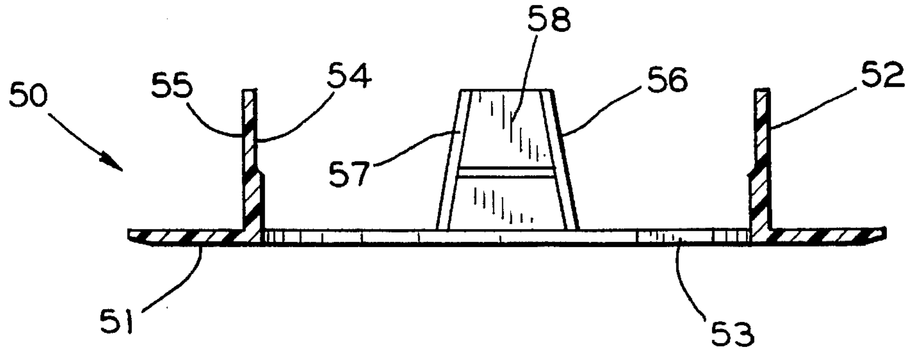
FIG. 6 is a side view, in cross section, of the locating ring illustrated in FIG. 5.

An alternate embodiment of the locating ring of the invention is illustrated in FIGS. 5 and 6. In this embodiment, the locating ring 50 includes a generally flat ring portion 51 with a plurality of circumferentially spaced support tabs 52 extending generally perpendicularly from the inner circumference of the ring portion 51. The ring portion 51 is provided with a gap 53 or other form of aperture for the coil connecting leads (not shown).

As best seen in FIG. 5, each support tab 52 includes a radially inner face 54 and a radially outer face 55, with a sidewall extending therebetween. In this embodiment, the means for receiving the encapsulating material includes a taper formed along at least a portion of the sidewall of each of the support tabs 52. Preferably, each of the axially extending sidewall portions 56 and 57 of the sidewall taper outwardly from the inner face 54 to the outer face 55. The upper portion 58 of the inner face 54 of each support tab 52 may also be tapered outwardly toward the outer face 55 thereof.

During the molding operation, the dielectric material which is injected into the mold 10 flows around the tapered sidewalls 56 and 57 flanges and the upper portion 58 of the inner face 54 of each tab 52. Thus, in the post-molded coil assembly, the overmold 24 resists radially inward movement of the tabs 52. This prevents the separation of the support tabs 52 from the overmold 24 during operation of the post-molded coil assembly.

In the illustrated embodiments, the electric coil is annular. However, rectangular and other coil shapes may be employed with the locating ring of the invention. Further, the dielectric encapsulating material used with the invention may be any suitable moldable material, which is typically a thermoplastic or thermoset. Polypropylene, polyethylene terephthalate, and nylon are examples of suitable materials. Similarly, the locating ring 20 may be formed of a temperature resistant plastic or any other suitable dielectric material, such as polypropylene, polyethylene terephthalate, or nylon, as examples. In a preferred embodiment, the encapsulating material and the locating ring 26 are formed of the same material.

In accordance with the provisions of the patent statutes, the invention has been described in what is considered to represent its preferred embodiment. However, it should be noted that the invention can be practiced otherwise than as specifically illustrated and described without departing from its spirit or scope.

What is claimed is:

1. A locating ring for positioning and supporting an electric coil within a mold for encapsulation by a dielectric material, said locating ring comprising:

a body including an inner peripheral edge, an outer peripheral edge, and a support surface extending between said inner peripheral edge and said outer peripheral edge, said support surface adapted to support the electric coil thereon within the mold for encapsulation; and a support tab extending from said support surface of said body adjacent to said inner peripheral edge, said support tab including an inner radial face defining a first width, an outer radial face defining a second width, and a sidewall extending between said inner radial face and said outer radial face, said first width of said inner radial face being less than said second width of said outer radial face so as to define a recessed area in said sidewall, said outer radial face of said support tab adapted to engage the inner surface of the electric coil to position the electric coil on said support surface of said body within the mold for encapsulation by the dielectric material.

2. The locating ring defined in claim 1 wherein said support tab includes a pair of sidewalls extending between said inner radial face and said outer radial face, said first width of said inner radial face being less than said second width of said outer radial face so as to define a recessed area in each of said sidewalls.

3. The locating ring defined in claim 1 further including an opening formed through said locating ring adjacent to said support tab.

4. The locating ring defined in claim 3 wherein said opening includes an axially extending portion formed through said support surface.

5. The locating ring defined in claim 3 wherein said opening includes a radially extending portion extending through said support tab.

6. The locating ring defined in claim 3 wherein said opening includes an axially extending portion formed through said support surface and a radially extending portion extending through said support tab.

7. The locating ring defined in claim 1 wherein said recess in said sidewall of said support tab is stepped between said inner radial face and said outer radial face to define a flange.

8. The locating ring defined in claim 1 wherein said recess in said sidewall of said support tab is tapered between said inner radial face and said outer radial face.

9. The locating ring defined in claim 1 wherein a plurality of support tabs extend from said support surface of said body adjacent to said inner peripheral edge, each of said support tabs including an inner radial face defining a first width, an outer radial face defining a second width, and a sidewall extending between said inner radial face and said outer radial face, said first widths of said inner radial faces being less than said second widths of said outer radial faces so as to define recessed areas in each of said sidewalls, said outer radial faces of said support tabs adapted to engage the inner surface of the electric coil to position the electric coil on said support surface of said body within the mold for encapsulation by the dielectric material.

10. The locating ring defined in claim 9 wherein each of said support tabs includes a pair of sidewalls extending between said inner radial face and said outer radial face, said first widths of said inner radial faces being less than said second widths of said outer radial faces so as to define recessed areas in each of said sidewalls.

11. An encapsulated electric coil assembly comprising:

a locating ring including a body having an inner peripheral edge, an outer peripheral edge, and a support surface extending between said inner peripheral edge and said outer peripheral edge, said locating ring further including a support tab extending from said support surface of said body adjacent to said inner peripheral edge, said support tab including an inner radial face defining a first width, an outer radial face defining a second width, and a sidewall extending between said inner radial face and said outer radial face, said first width of said inner radial face being less than said second width of said outer radial face so as to define a recessed area in said sidewall;

an electric coil having an inner surface, an outer surface, an upper end surface, and a lower end surface, said lower end surface of said electric coil being supported on said support surface of said locating ring, said inner surface of said electric coil being engaged with said outer radial face of said support tab to position said electric coil on said support surface of said body; and an overmold of a dielectric material extending over portions of said outer surface, said upper end surface, and said inner surface of said electric coil and into said recessed area in said sidewall of said support tab of said locating ring.

12. The locating ring defined in claim 11 wherein said support tab includes a pair of sidewalls extending between said inner radial face and said outer radial face, said first width of said inner radial face being less than said second width of said outer radial face so as to define a recessed area in each of said sidewalls.

13. The locating ring defined in claim 11 further including an opening formed through said locating ring adjacent to said support tab.

14. The locating ring defined in claim 13 wherein said opening includes an axially extending portion formed through said support surface.

15. The locating ring defined in claim 13 wherein said opening includes a radially extending portion extending through said support tab.

16. The locating ring defined in claim 11 wherein said recess in said sidewall of said support tab is stepped between said inner radial face and said outer radial face to define a flange.

17. The locating ring defined in claim 11 wherein said recess in said sidewall of said support tab is tapered between said inner radial face and said outer radial face.

18. The locating ring defined in claim 11 wherein a plurality of support tabs extend from said support surface of said body adjacent to said inner peripheral edge, each of said support tabs including an inner radial face defining a first width, an outer radial face defining a second width, and a sidewall extending between said inner radial face and said outer radial face, said first widths of said inner radial faces being less than said second widths of said outer radial faces so as to define recessed areas in each of said sidewalls, said outer radial faces of said support tabs adapted to engage the inner surface of the electric coil to position the electric coil on said support surface of said body within the mold for encapsulation by the dielectric material.

19. The locating ring defined in claim 18 wherein each of said support tabs includes a pair of sidewalls extending between said inner radial face and said outer radial face, said first widths of said inner radial faces being less than said second widths of said outer radial faces so as to define recessed areas in each of said sidewalls.

20. A method of manufacturing an encapsulated electric coil assembly comprising the steps of:

(a) providing a locating ring including a body having an inner peripheral edge, an outer peripheral edge, and a support surface extending between the inner peripheral edge and the outer peripheral edge, the locating ring further including a support tab extending from the support surface of the body adjacent to the inner peripheral edge, the support tab including an inner radial face defining a first width, an outer radial face defining a second width, and a sidewall extending between the inner radial face and the outer radial face, the first width of the inner radial face being less than the second width of the outer radial face so as to define a recessed area in the sidewall;

(b) providing an electric coil having an inner surface, an outer surface, an upper end surface, and a lower end surface;

(c) positioning the electric coil relative to the locating ring such that the lower end surface of the electric coil is supported on the support surface of the locating ring and the inner surface of the electric coil is engaged with the outer radial face of the support tab; and (d) overmolding a dielectric material over portions of the outer surface, the upper end surface, and the inner surface of the electric coil and into the recessed area in the sidewall of the support tab of the locating ring.

* * * * *